No. 763,542. PATENTED JUNE 28, 1904.
A. V. CRAWFORD & J. GORDON.
PIPE JOINT.
APPLICATION FILED FEB. 18, 1903.
NO MODEL.
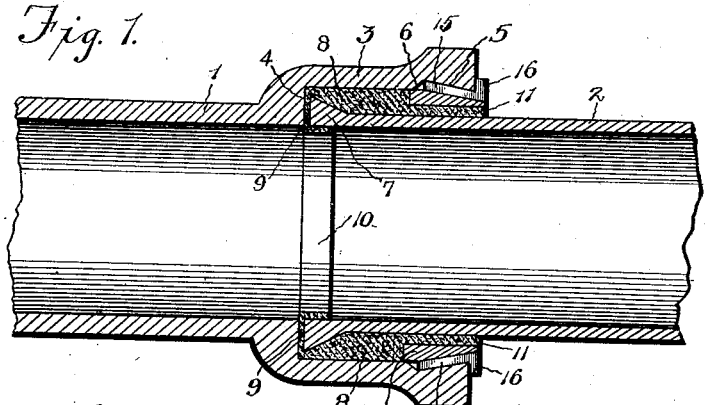
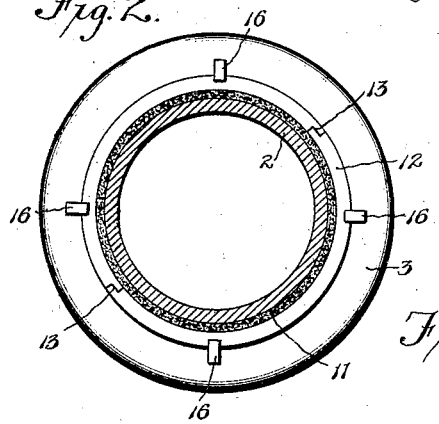
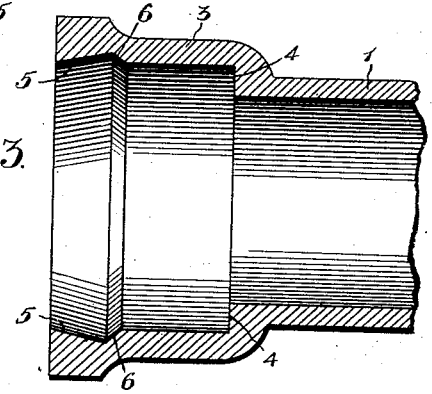
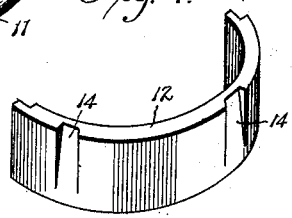
Witnesses
Ralph A. Shepard
H. S. Shepard
Andrew V. Crawford, Inventors
John Gordon
By C. C. Shepard
Attorney No. 763,542. Patented June 28, 1904.

UNITED STATES PATENT OFFICE.

ANDREW V. CRAWFORD AND JOHN GORDON, OF COLUMBUS, OHIO.

PIPE-JOINT.

SPECIFICATION forming part of Letters Patent No. 763,542, dated June 28, 1904.

Application filed February 18, 1903. Serial No. 143,971. (No model.)

*To all whom it may concern:*

Be it known that we, ANDREW V. CRAWFORD and JOHN GORDON, citizens of the United States, residing at Columbus, in the county of Franklin and State of Ohio, have invented a certain new and useful Improvement in Pipe-Joints, of which the following is a specification.

This invention relates to pipe-joints, and has for its object to provide an electrically-insulated joint, so as to prevent electrolysis of water and gas mains.

With this object in view the present invention consists in the combination and arrangement of parts, as will be hereinafter more fully described, shown in the accompanying drawings, and particularly pointed out in the appended claims, it being understood that changes in the form, proportion, size, and minor details may be made within the scope of the claims without departing from the spirit or sacrificing any of the advantages of the present invention.

In the drawings, Figure 1 is a longitudinal sectional view of an insulated pipe-joint embodying the features of the present invention. Fig. 2 is a cross-sectional view taken in front of the bell end of one of the pipe-sections. Fig. 3 is a detail sectional view of the bell end of one of the pipe-sections. Fig. 4 is a detail perspective view of one of the packing-ring sections.

Like characters of reference designate corresponding parts in each and every figure of the drawings.

For an adequate understanding of the present invention there has been shown in the drawings the abutted ends of opposite pipe-sections 1 and 2, of which the section 2 has its spigot end fitted within the bell end 3 of the section 1. The bell portion 3 is provided at its inner end with the usual annular shoulder 4, and in addition thereto is provided at its outer end with an inner annular groove or seat 5, which increases in its diameter inwardly from its outer edge to an intermediate point, as indicated at 6, and then decreases in diameter to its inner edge, whereby said groove or seat is depressed at an intermediate point, and hence has double beveled walls.

As is shown, the spigot end of the pipe-section 2 is externally enlarged, as indicated at 7, with the outer peripheral edge of the enlarged portion beveled inwardly, and upon this spigot end the tubular jacket 8 is snugly fitted. This jacket is formed of some electrical non-conducting material—as, for instance, rubber or rubber fabric—and is of a thickness to snugly fit between the spigot portion of the pipe-section 2 and the bell 3, so as to effectually insulate these members. The outer end of the non-conducting jacket 8 is reduced upon its interior to fit the enlarged portion 7 of the pipe-section 2 and is provided with an internal annular flange 9, which fits between the extremity of the pipe-section 2 and the shoulder 4 of the bell, so as to insulate these portions. At the inner peripheral edge of the flange 9 is an inwardly-directed cylindrical rim portion 10, that snugly fits the interior of the pipe 2, so as to prevent the packing-ring portion 9 from rucking up or becoming displaced to such an extent as to uncover portions of the pipe-sections 1 and 2. This rim 10 forms a broad exposed insulating-band upon the interior of the coupling at the joint thereof and effectually prevents electrical bridging of the joint. The outer end portion of the jacket 8 is externally reduced, as indicated at 11.

To hold the jacket in intimate engagement with the pipe-section 2, and thereby to prevent displacement of the jacket, there is provided a metallic packing-ring 12, which is fitted in the space between the reduced portion 11 of the jacket and the walls of the groove or seat 5, said ring being preferably formed in sections, with their ends abutted in a lap or tongue-and-groove joint, as best indicated at 13 in Fig. 2 of the drawings. In the outer peripheral face of each ring-section there are transverse seats or recesses 14, the backs of which are beveled or inclined to correspond with the adjacent beveled wall of the groove or seat 5 in the bell 3, and into these grooves are driven wedges 15 to bind the metallic ring-sections 12 upon the jacket 8, and thereby force the latter into intimate contact with both pipe-sections. Each wedge 15 is provided at its outer end with a head 16, that overlaps the outer end of the bell, so as to limit the insertion of the wedge and also facilitate the prying out of the wedge when it is desired to disconnect the pipe-sections.

An important advantage of the present invention resides in the provision of the groove or seat 5 having a beveled peripheral wall, as it permits of the ring 12 being placed within the bell without regard to any predetermined relative positions of the beveled recesses 14, as would be necessary if the bell were provided with recesses to register with the recesses 14.

From the foregoing description it is apparent that the present invention provides for effectually insulating one pipe-section from another, and thereby prevents electrolysis and consequent damage of the pipes.

This invention is particularly adapted for water and gas mains, but of course may be applied in any relation whatsoever without departing from the spirit of the invention.

Having thus described the invention, what is claimed, and desired to be secured by Letters Patent, is—

1. The combination with opposite pipe-sections, one of which is fitted within the other, of a flexible jacket fitted between the overlapped portions of the pipes, a packing-ring embracing the jacket, and wedges driven in between the packing-ring and the outer pipe.

2. The combination with opposite pipe-sections, one of which is fitted within the other, of a flexible jacket fitted between the overlapped portions of the pipes, a packing-ring fitted between the jacket and the outer pipe and provided with external seats, and wedges driven into the seats and in engagement with the outer pipe.

3. The combination with opposite pipe-sections, one of which is fitted within the other, of a flexible jacket fitted between the overlapped portions of the pipes, a sectional packing-ring fitted between the jacket and the outer pipe and provided in its outer face with transverse seats having inclined backs, and wedges driven into the seats and engaging the outer pipe.

4. The combination with a pipe-section having a bell end provided with an inner undercut annular groove, another pipe fitted within the bell, a packing-ring fitted between the overlapped portions of the pipes and located opposite the groove in the bell, the outer face of the packing-ring being provided with transverse seats, and wedges driven into the seats and bearing against the wall of the undercut groove.

5. The combination with a pipe having its bell provided at the outer end with an inner undercut annular groove, another pipe fitted within the bell, a sectional packing-ring embracing said other pipe and located opposite the groove in the bell, the outer faces of the sectional ring being provided with transverse seats having inclined backs, and wedges driven into the seats and bearing against the wall of the undercut groove.

6. The combination with a pipe having its bell provided in the outer end with an undercut inner annular groove, another pipe fitted within the bell, a flexible jacket fitted between the overlapped portions of the pipes, a sectional packing-ring embracing the jacket and located opposite the groove in the bell, the outer faces of the ring-sections being provided with transverse seats having inclined backs, and wedges driven into the seats and engaging the wall of the undercut groove.

ANDREW V. CRAWFORD.
JOHN GORDON.

In presence of—
A. L. PHELPS,
W. L. MORROW.